ated Sept. 10, 1968

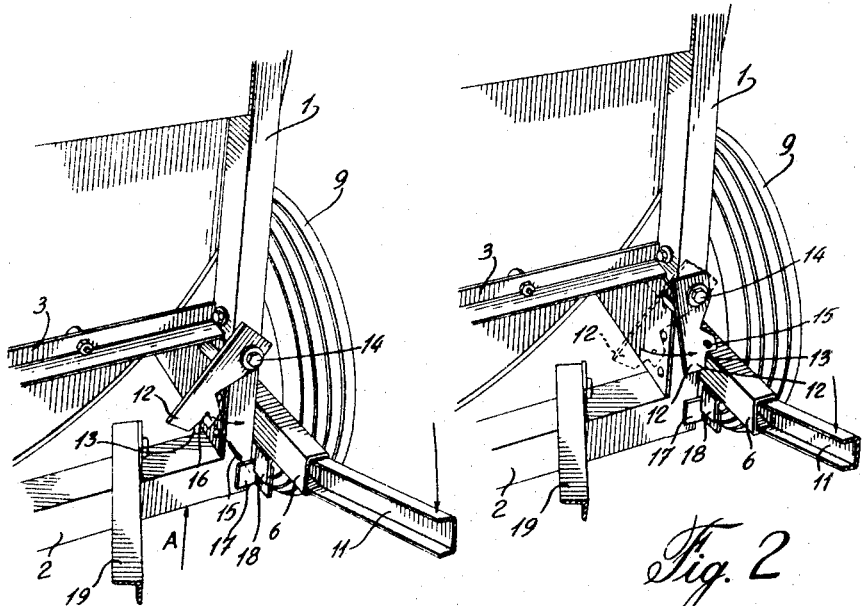
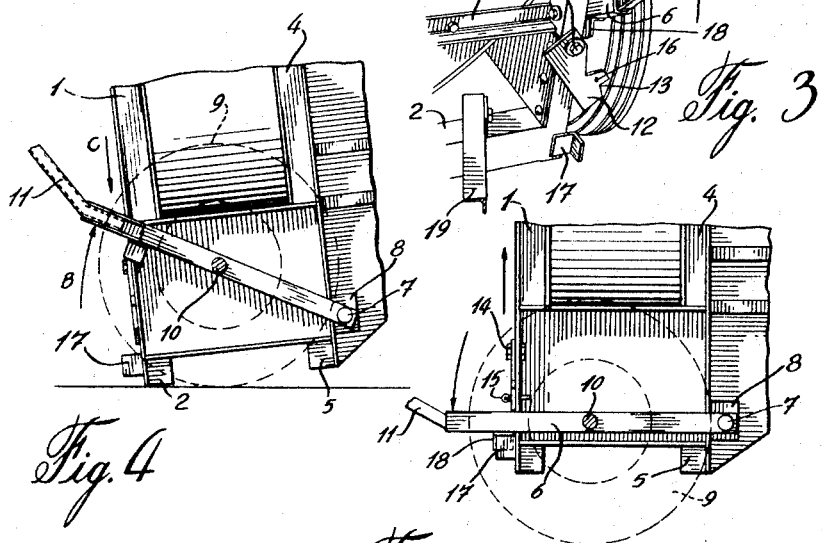

United States Patent Office 3,400,944
Patented Sept. 10, 1968

3,400,944
MANUALLY OPERABLE RETRACTABLE WHEEL MOUNT FOR SEMI-PORTABLE FARM EQUIPMENT AND THE LIKE
Narcisse Dion, Ste-Therese-de-Blainville, Quebec, Canada, assignor to Dion Freres, Inc., Ste-Therese-de-Blainville, Quebec, Canada
Filed Dec. 19, 1966, Ser. No. 602,605
3 Claims. (Cl. 280—43.24)

ABSTRACT OF THE DISCLOSURE

Retractable wheels for a vehicle having two wheels so that the frame of the vehicle may contact the ground and establish a solid stand for the vehicle. Each wheel is mounted on a lever pivoting on an axle mounted on the frame and eccentrically located with the axis of the wheel. The lever may be immobilized in a lower position so as to provide contact between the wheel and the ground for the transport position. The lever may be disengaged from the transport position so as to be brought in an upper position with the wheel until the frame of the vehicle contacts the ground.

Background of the invention

This invention relates to a semi-portable frame which may be moved on wheels. It is more specifically directed to a manually operable retractable wheel mount for such a semi-portable vehicle.

In order to immobilize a vehicle, a braking device is usually provided. Other means are used to hold a vehicle in a stopped position. Such means may be a handle adapted to contact the ground such as for a wheel-barrow or a light trailer for cars.

In some cases, a fixed lever may be considered cumbersome or may not constitute a sufficiently solid arrangement to hold the vehicle in a rest position. In particular cases, when a vehicle is relatively high for its size, it may be advantageous to lower the frame of the vehicle and obtain a solid contact with the ground.

Summary of the invention

The invention is directed to a vehicle which comprises a frame having side members and at least two wheels located at one end of the frame and on both sides thereto, lever means pivotally mounted on each side members, an axle on said lever means for rotatably engaging said wheel, locking means pivotally mounted on said frame for stopping the lever, means in its lower position, whereby the frame is supported by the wheels, while the lever means, in the upper position, is adapted to let the frame rest on the ground.

The two retractable wheels may be either separately mounted on each lever means or jointly mounted to move simultaneously. The means for locking the lever consists preferably in a plate having a notch and which pivots on the frame and engages the lever means.

An object of the present invention consists essentially in providing a vehicle having in general two wheels with a retractable arrangement for the wheels so that the frame of the vehicle may come in touch with the ground.

An additional object of the invention is to provide retractable wheels for a piece of equipment which may be manually transported.

Another object of the invention is to provide a short vehicle having only two wheels with means to immobilize the said vehicle by retracting the wheels so that the frame may rest on the ground.

A further object of the invention consists of an arrangement which may be used on a four-wheel transportation equipment, two of the said wheels being retractable in order to enable a part of the frame to come in contact with the ground.

Brief description of the drawings

FIGURE 1 is a perspective view of a portion of a vehicle with a wheel in a semi-retracted position;

FIGURE 2 is a perspective view of a portion of a vehicle showing the wheel in the transport position;

FIGURE 3 is a perspective view of a portion of a vehicle with the wheel in a retracted position;

FIGURE 4 is a sectional view of a portion of a vehicle showing the wheel in a retracted position;

FIGURE 5 is a sectional view of a portion of a vehicle showing the wheel in the transport position.

Description of the preferred embodiment

As shown in the drawings, the frame is schematically represented by an upstanding beam 1 and a horizontal beam 2 at the lower end thereof. The frame has additional structural components such as a cross-bar 3, an intermediate beam 4 and a bottom beam 5 according to the type of vehicle which is to be supported.

A lever 6 formed by a C-shaped beam is pivotally mounted on the side of the frame and pivots around the axle 7. As illustrated in FIGURES 4 and 5, axle 7 is mounted on an angle piece 8 welded to the intermediate beam 4 and at the lower end thereof. A wheel 9 is pivotally mounted on the lever 6 about an axis 10 which is eccentrically positioned in view of the axle 7. The axis 10 is located in view of the frame so as to provide the desired support and balance for the frame of the vehicle.

When the lever 6 is free to move around the axle 7, the frame of the vehicle will normally fall slightly forward so that the horizontal beam 2 will come in touch with the ground and subsequently the bottom beam 5 will follow the same pattern.

When the wheels 9 are needed for transporting the vehicle, a handle 11 which has a complementary C-shaped corresponding to the shape of the lever 6 and adapted to be introduced therein, is used to actuate the lever 6 and to lower wheel while the frame is raised in the direction of the arrow A (see FIGURE 1). It may be realized that in order to raise the frame of the vehicle, the latter needs to be portable or at least semi-portable that is, it may be lifted by one or not more than few operators. When the frame has been sufficiently lifted and the handle 11 maintained in its lower position, the wheel 9 has reached a position illustrated in FIGURES 2 and 5 which is the transport position. In order to lock the lever in the transport position, a plate 12 having a notch 13 is foreseen to lock the lever 6. The plate 12 is pivotally mounted on the beam 1 by a screw or rivet 14 in a position adjacent the lever 6. The plate 12 is preferably mounted on the beam 1 so that it will fall by gravity in a position so that the notch 13 will engage the lever 6. However, in order to prevent the plate 12 from moving out of engagement with the lever 6, a pin 15 is introduced into a hole 16 located in the plate 12 so as to rest against the side of the beam 1. When the notch 13 of the plate 12 engages the upper surface of the lever 6 as shown in FIGURES 2 and 5, the vehicle is in a transport position, that is, the frame is in a raised position and the wheel 9 is in touch with the ground and provides an adequate clearance to the frame.

In order to hold the lever 6 in a relatively fixed lower position when the wheel 9 is in the transport position, two angle-plates 17 and 18 are adapted to grip each other. An angle-plate 17 is solidly fixed to the lower end of the frame that is, at the intersection of the horizontal beam 2 and the vertical beam 1 and the other angle-plate 18 is solidly fixed to the lever 6. One arm of each of the two angle-plates 17 and 18 overlapped each other in order to stop the lever 6 in a relatively steady position below the notch 13.

When the vehicle needs to be immobilized, the pin 15 is removed from the hole 16 and the handle 11 is introduced into the lever 6. The handle 11 is slightly lowered to disengage the notch 13 from the lever 6 and subsequently the handle is slowly raised in the direction of the arrow B (see FIGURE 4) while the frame of the vehicle lowers in the direction of the arrow C (see FIGURE 4) and finally contacts completely the ground.

A towing bar 19 is represented in the figures to illustrate that the vehicle may also be pulled by a self-propelled carriage.

The embodiment above described represents one wheel which is pivotally mounted on one lever on one side of the vehicle. It is understood that the same arrangement exists on the other side of the vehicle. However, a similar arrangement may be foreseen with a common axle passing across the vehicle so that the two sides are lowered simultaneously. Obviously, a common shaft which would be used for the two wheels would require appropriate space underneath the frame and slots in the side plates of the frame, so that the common shaft will be permitted to move freely upwardly and downwardly.

I claim:

1. A vehicle comprising a frame having side members and at least two wheels located at one end of the frame and on both sides thereto, lever means pivotally mounted on each side members, an axle in said lever means for rotatably engaging said wheel, a locking plate pivotally mounted freely on said frame, the said locking plate reaches its lowermost position by gravity and has a notch at its lower end for stopping the lever means in its lower position, the said plate further comprising a sloping side so that the lowering of the lever means automatically displaces the plate out of its way, whereby the vehicle is changed from a position of rest to a position of movement only by the lowering of the lever means and the raising of the same.

2. A vehicle as recited in claim 1, whereby each wheel is separately mounted on each leyer means.

3. A vehicle as recited in claim 1, wherein the plate and the frame are interlocked by a pin.

References Cited

UNITED STATES PATENTS 2,374,982   5/1945   Davies _____ 280—43.24
2,528,452  10/1950   Riley et al. _____ 280—43.24
2,915,318  12/1959   Chesser _____ 280—43.24

BENJAMIN HERSH, *Primary Examiner.*

R. SONG, *Assistant Examiner.*